(12) United States Patent
Spinella et al.

(10) Patent No.: US 7,718,918 B2
(45) Date of Patent: May 18, 2010

(54) PRODUCTION OR ASSEMBLY LINE METHOD OF SPOT WELDING

(75) Inventors: Donald J. Spinella, Greensburg, PA (US); John R. Brockenbrough, Murrysville, PA (US); Joseph M. Fridy, Pittsburgh, PA (US)

(73) Assignee: Alcoa Inc, Alcoa Center, PA (US)

( * ) Notice: Subject to any disclaimer, the term of this patent is extended or adjusted under 35 U.S.C. 154(b) by 0 days.

(21) Appl. No.: 12/246,820

(22) Filed: Oct. 7, 2008

(65) Prior Publication Data
US 2009/0084763 A1    Apr. 2, 2009

Related U.S. Application Data

(63) Continuation-in-part of application No. 11/298,216, filed on Dec. 9, 2005, now Pat. No. 7,432,466.

(51) Int. Cl.
*B23K 11/24* (2006.01)
(52) U.S. Cl. .................. 219/110; 219/86.8; 219/86.51; 219/86.1
(58) Field of Classification Search ............... 219/61.4, 219/69.15, 78.01, 85.16, 86.1, 86.33, 86.41, 219/86.51, 117.1, 118, 119, 86.8, 75, 110
See application file for complete search history.

(56) References Cited

U.S. PATENT DOCUMENTS

| | | | |
|---|---|---|---|
| 2,021,477 | A | 11/1935 | Bohn |
| 2,961,528 | A | 11/1960 | Dixon |
| 3,592,994 | A | 7/1971 | Ford |
| 3,689,731 | A | 9/1972 | Miller |
| 3,693,238 | A | 9/1972 | Hoch et al. |

(Continued)

FOREIGN PATENT DOCUMENTS

DE    19917896    10/1999

(Continued)

OTHER PUBLICATIONS

Arrington, Jr., Samuel E., "Twisting Electrodes Improve Tip Life and Weld Quality on Resistance Spot Welded Aluminum Sheet", SAE Technical Paper Series 950717, Detroit, MI (1995).

(Continued)

*Primary Examiner*—Roy King
*Assistant Examiner*—Michael Aboagye
(74) *Attorney, Agent, or Firm*—Greenberg Traurig LLP

(57) ABSTRACT

A production line method of resistance welding comprising the steps of contacting a metal sheet with an electrode having an initial contact surface area at a force to provide a pressure to the metal sheet; applying a current though the electrode to the metal sheet; measuring dimensional changes of the electrode; correlating dimensional changes in the electrode to changes in the initial contact surface area; and adjusting the force to compensate for the changes in the initial contact surface area of the electrode to maintain pressure to the metal sheet. The force may be adjusted by stepping the force to maintain pressure to the faying surface of the metal sheet to be welded. By maintaining the pressure at the faying surface the life cycle of the electrodes may be increased without forming discrepant welds.

4 Claims, 14 Drawing Sheets

U.S. PATENT DOCUMENTS

| | | | |
|---|---|---|---|
| 3,973,715 | A | 8/1976 | Rust |
| 4,296,304 | A | 10/1981 | Defourny |
| 4,317,980 | A | 3/1982 | Goodrich et al. |
| 4,472,620 | A | 9/1984 | Nied |
| 4,497,994 | A | 2/1985 | Flemm et al. |
| 4,633,054 | A | 12/1986 | Patrick et al. |
| 4,634,829 | A | 1/1987 | Okabe et al. |
| 4,694,135 | A | 9/1987 | Nagel et al. |
| 4,733,042 | A | 3/1988 | Nishiwaki et al. |
| 4,945,201 | A | 7/1990 | Ito et al. |
| 4,954,687 | A | 9/1990 | Bush et al. |
| 4,972,047 | A | 11/1990 | Puddle et al. |
| 5,066,845 | A | 11/1991 | Anderson |
| 5,083,003 | A | 1/1992 | Clark, Jr. et al. |
| 5,225,025 | A | 7/1993 | Lambing et al. |
| 5,302,797 | A | 4/1994 | Yasuyama et al. |
| 5,395,687 | A | 3/1995 | Totsuka et al. |
| 5,409,156 | A | 4/1995 | Tsuji et al. |
| 5,449,878 | A | 9/1995 | Beneteau et al. |
| 5,504,299 | A | 4/1996 | Heckendorn |
| 5,541,382 | A | 7/1996 | Taylor et al. |
| 5,789,719 | A | 8/1998 | Pary et al. |
| 5,906,755 | A | 5/1999 | Arasuna et al. |
| 6,054,668 | A | 4/2000 | Van Otteren et al. |
| 6,084,195 | A | 7/2000 | Swaggerty et al. |
| 6,198,071 | B1 | 3/2001 | Kitsunai |
| 6,232,572 | B1 | 5/2001 | Kanjo |
| 6,342,686 | B1 * | 1/2002 | Farrow ............... 219/109 |
| 6,403,913 | B1 | 6/2002 | Spinella et al. |
| 6,646,221 | B2 | 11/2003 | Wang et al. |
| 6,903,298 | B2 * | 6/2005 | Wang et al. ............ 219/110 |
| 2002/0053555 | A1 | 5/2002 | Matsuyama |
| 2005/0045597 | A1 | 3/2005 | Wang et al. |

FOREIGN PATENT DOCUMENTS

| | | |
|---|---|---|
| JP | 06-007954 | 1/1994 |
| WO | 95/17989 | 7/1995 |
| WO | 2007067977 | 6/2007 |

OTHER PUBLICATIONS

Ashton, R. F. & Rager, D. D., "An Arc-Cleaning Approach For Resistance Welding Aluminum", Welding Journal 55 (9); pp. 750 to 757 (1976).

Boomer, D. R., Hunter, J. A., and Castle, D. R., "A New Approach For Robust High-Productivity Resistance Spot Welding of Aluminum", SAE Technical Paper 2003-01-0575, Detroit, MI (2003).

Saunders, H. L., Chapter 14 "Resistance Welding", pp. 14.1-14.13, The Aluminum Association, Welding Aluminum: Theory and Practice, Fourth Edition (2002).

Spinella, D. J. et al, "Trends in Aluminum Resistance Spot Welding for the Auto Industry", Welding Journal, American Welding Society, Miami, FL, US; vol. 84, No. 1, Jan. 2005, pp. 34-40.

Fukomoto, S. et al., "Effects of Electrode Degradation on Electrode Life in Resistance Spot Welding of Aluminum Alloy 5182", Welding Journal, American Welding Society, Miami, FL, US, vol. 82, No. 11, Nov. 2003, pp. 307-312.

International Search Report and Written Opinion of the International Searching Authority from International Application No. PCT/US2006/061787 dated Apr. 13, 2007.

International Search Report and Written Opinion of the International Searching Authority pertaining to related International Appliction No. PCT/US2009/030334, mailed on Jun. 29, 2009.

\* cited by examiner

| WELD NUMBER | FORCE (kN) | CURRENT (kA RMS) |
|---|---|---|
| 100 | 2.67 | 24.0 |
| 200 | 2.74 | 24.6 |
| 300 | 2.81 | 25.2 |
| 400 | 2.88 | 25.9 |
| 500 | 2.95 | 26.5 |
| 600 | 3.02 | 27.1 |
| 700 | 3.08 | 27.7 |
| 800 | 3.16 | 28.3 |
| 900 | 3.22 | 29.0 |
| 1000 | 3.29 | 29.6 |
| 1100 | 3.36 | 30.2 |
| 1200 | 3.43 | 30.8 |
| 1300 | 3.50 | 31.5 |
| 1400 | 3.57 | 32.1 |
| 1500 | 3.64 | 32.7 |
| 1600 | 3.71 | 33.3 |
| 1700 | 3.77 | 33.9 |
| 1800 | 3.84 | 34.6 |
| 1900 | 3.91 | 35.2 |
| 2000 | 3.98 | 35.8 |
| 2100 | 4.05 | 36.4 |
| 2200 | 4.12 | 37.0 |
| 2300 | 4.19 | 37.7 |
| 2400 | 4.26 | 38.2 |

*FIG.11*

PRODUCTION OR ASSEMBLY LINE METHOD OF SPOT WELDING

CROSS REFERENCE TO RELATED APPLICATIONS

The present invention is a continuation-in-part application of U.S. patent application Ser. No. 11/298,216, entitled "METHOD OF ELECTRICAL RESISTANCE SPOT WELDING" filed on Dec. 9, 2005 now U.S. Pat. No. 7,432,466, which is incorporated herein.

FIELD OF THE INVENTION

The present invention relates to an electrical resistance welding method. More specifically, an electrical resistance welding process is provided that adjusts the force applied to the electrodes to correspond to dimensional changes in the electrode cross-section. By measuring the dimensional changes of the electrodes cross-section and adjusting the force applied to the electrodes to correspond to the dimensional changes in the electrode the welding process lifetime can be increased without degrading welding performance.

BACKGROUND OF THE INVENTION

Resistance spot welding of aluminum processes traditionally has a lower electrode life than gauged steel and coated steel resistance welding methods. Increased electrode life is desired because it reduces maintenance cost; increases weld quality, and most importantly yields higher production. One disadvantage of resistance welding of aluminum is erosion of the electrodes, which results in changes of the tip geometry of the electrode contact surfaces. Changes in electrode tip geometry cause irregulars in pressure and current distribution, at the faying surface of the welded metal sheets throughout the life cycle of the welding process and eventually results in insufficient or discrepant welds. One example of a discrepant weld obtained during peel testing is depicted in FIG. 1.

Prior methods to increase the life cycle of resistance spot welding of aluminum modify the contact resistance of the aluminum welding surfaces either through mechanical and/or chemical means. A few examples include: twisting electrodes, arc cleaning the aluminum sheet's surface, and differential surface treatments. While these techniques can enhance performance they are not easily incorporated into existing resistance spot welding processes and disadvantageously increase process cost.

Another method of increasing the life cycle of the electrodes in resistance spot welding is current stepping. Current stepping is the increase of current to compensate for the increase in surface area of the electrode contact surface due to erosion. Typically, current stepping is programmed by the user in increments of welds performed. For example, welds 1-100 being conducted at 24.0 kA and welds 10-200 being conducted at 25.0 kA.

Additionally, the lifecycle of resistance spot welding of aluminum metal may be increased by mechanically polishing electrodes at a frequency of about 14-20 welds between polishing. In this method, the tool and abrading medium, such as sandpaper, scotchbrite or cutting tools, are placed between the electrodes under low pressure and rotated until the intermetallic that is produced on the electrode tip during electrode erosion is removed. Similar to the above-described prior solutions to increasing the life cycle of resistance welding, mechanical polishing of electrodes is not easily incorporated into existing processes and disadvantageously increases production cost.

U.S. Patent Application Publication 2005/0045597 A1, entitled "Resistance Welding Condition Method", to Wang et at. ("Wang et al.") describes one prior method of monitoring weld quality in resistance welding. Wang et al. discloses that weld quality may be monitored by measuring dimensional changes in the weld indentation at the welding surface. Wang et al. further discloses that weld quality may be improved by varying the welding current in response to dimensional changes in the weld indentation of the welding process. Similar to other conventional welding processes, Wang et al. does not measure dimensional changes in the electrode due to electrode erosion. Further, Wang et al. does not correlate dimensional changes in eroding electrodes to irregulars in pressure at the faying surface of metal sheets throughout the welding process.

What is needed is a method of resistance welding that increases electrode lifetime without substantial increasing production cost.

SUMMARY OF THE INVENTION

One aspect of the present invention is an improved method of resistance spot welding that does not require significant modification to existing resistance welding processes. Another aspect of the present invention provides a means of increasing electrode lifetime by maintaining the pressure applied to the welding surface during the lifetime of the electrode.

Over the service lifetime of the welding electrodes in electrical resistance welding, the contact surfaces of the electrode erode in response to the high currents required to weld low resistance metals. Erosion of the electrode tip (contact surface) creates an increased contact surface that distributes the force applied to surface to be wielded over a greater area. By distributing the force over a greater area, the pressure at the faying surface is decreased resulting in insufficient or discrepant welds. The present invention increases the service life of electrodes and decreases the incidence of discrepant welds by an inventive welding method that comprises the steps of:

contacting a metal sheet with at least one electrode having an initial contact surface area at a force to provide a pressure to said metal sheet; applying a current though said at least one electrode to said metal sheet; measuring dimensional changes of said at least one electrode; correlating said dimensional changes in said at least one electrode to changes in said initial contact surface area; and adjusting said force to compensate for said changes in said initial contact surface area of said at least one electrode to maintain said pressure to said metal sheet.

In one embodiment of the present invention, dimensional changes of the electrode are measured by correlating changes in stroke dimension to changes in the contact surface area of the tip of the electrode in the production or assembly line as well as off-line. The stroke dimension is defined as the distance of travel the electrode is actuated prior to current application. More specifically, the stroke dimension is equal to the difference in the electrode starting position and the position of the electrode when the electrode tip makes initial contact to the surface of the metal sheet. A mathematical algorithm correlates the changes in stroke dimension throughout the welding lifecycle to changes in the surface area of the electrode contact surface resulting from electrode erosion. In one embodiment, the mathematical algorithm is a function of the type of electrode geometry being employed.

In another embodiment of the present invention for a production line or off-line, changes in the surface area of the tip of the electrode may be determined by optical, laser, and mechanical measurements of the contact surface of the electrode. Optical, laser, and mechanical measurements of the impression of the electrode formed on the metal sheets may also provide dimensional changes in the electrode. An alternative off-line procedure is to measure dimensional changes in the electrode contact surface area which may be determined by making an impression of the contact surface of the electrode tip on a work piece separate from the metal sheet and measuring the dimensions of the impression, such as the impression's diameter.

In another embodiment of the present invention, changes in the surface area of the tip of the electrode may be determined by an off-line pressure transduce to monitor the amount of force required to maintain within a certain force window.

Once the changes in the electrode contact surface area are determined, the current and/or electrode force is stepped to compensate for the decrease in pressure at the faying surface that results from the increased contact surface area of the eroded electrode.

One embodiment that only adjusts force and not current to compensate for the decrease in pressure for the increased contact surface area of the eroded electrode includes weld controller logic to analyze changes of the electrode stroke to determine a new higher force to be applied to the electrode tips to reproduce the pressure on to the work pieces while maintaining the initial current utilizing a plurality of electrode length to force lookup tables for constant pressures and constant currents for a plurality of electrode types.

BRIEF DESCRIPTION OF THE DRAWINGS

FIG. 11 depicts a table illustrating current and force stepping;

DETAILED DESCRIPTION OF PREFERRED EMBODIMENTS

Figure 1:
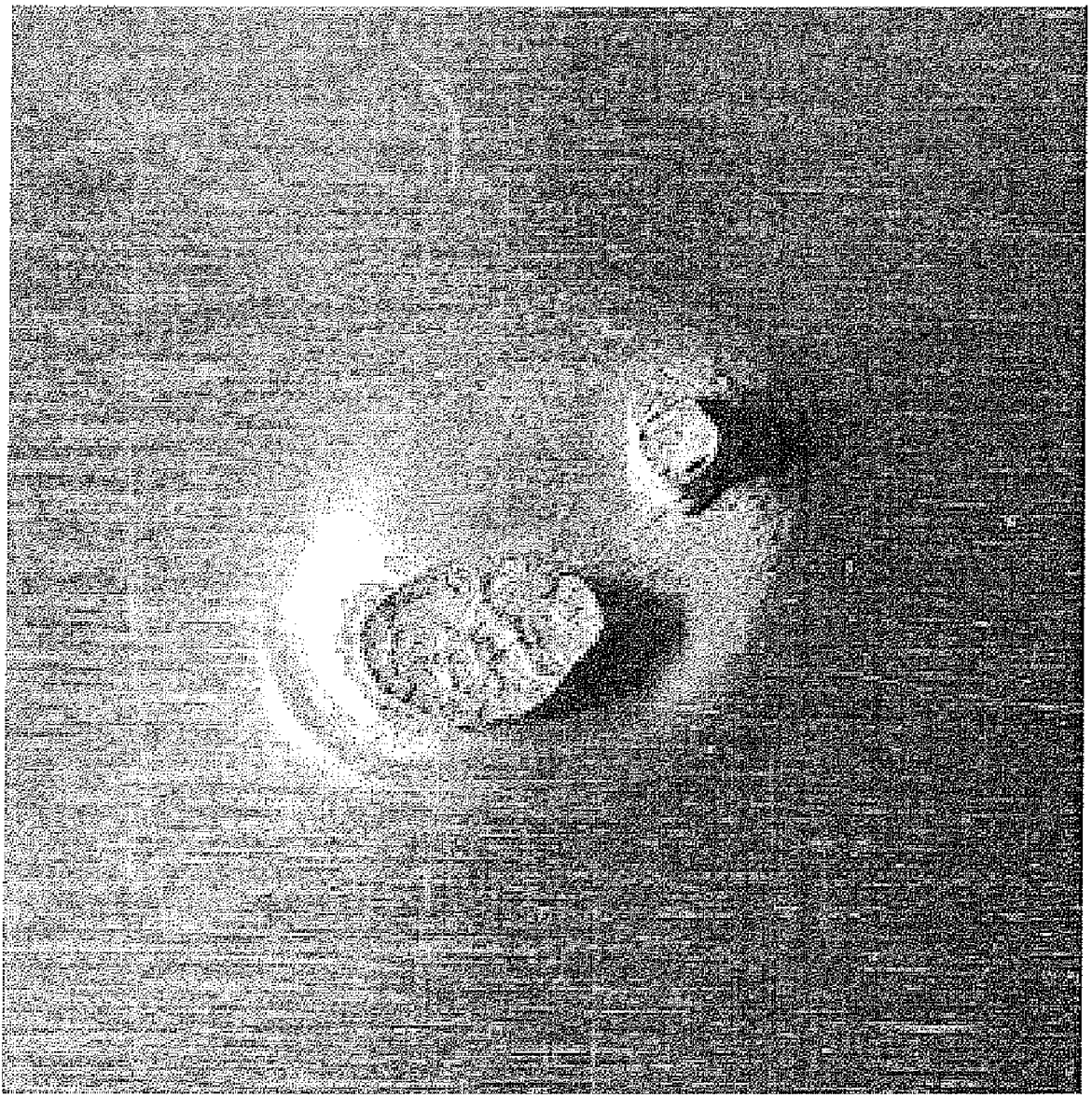
FIG. 1 (planar view) illustrates a discrepant weld from pill testing.

In one embodiment, the present invention provides a resistance welding method that maintains constant pressure at the faying surface of a welded aluminum. sheet by compensating for the changing dimensions in the contact surface of the eroding electrode by proportionally increasing the electrode force. In another embodiment of the present invention, a resistance welding method is provided in which the pressure to the faying surface is maintained above a threshold pressure and within a preselected range of pressures. The present invention is now discussed in more detail referring to the drawings that accompany the present application. It is noted that in the accompanied drawings, like and/or corresponding elements are referred to by like reference numbers.

Figure 2:
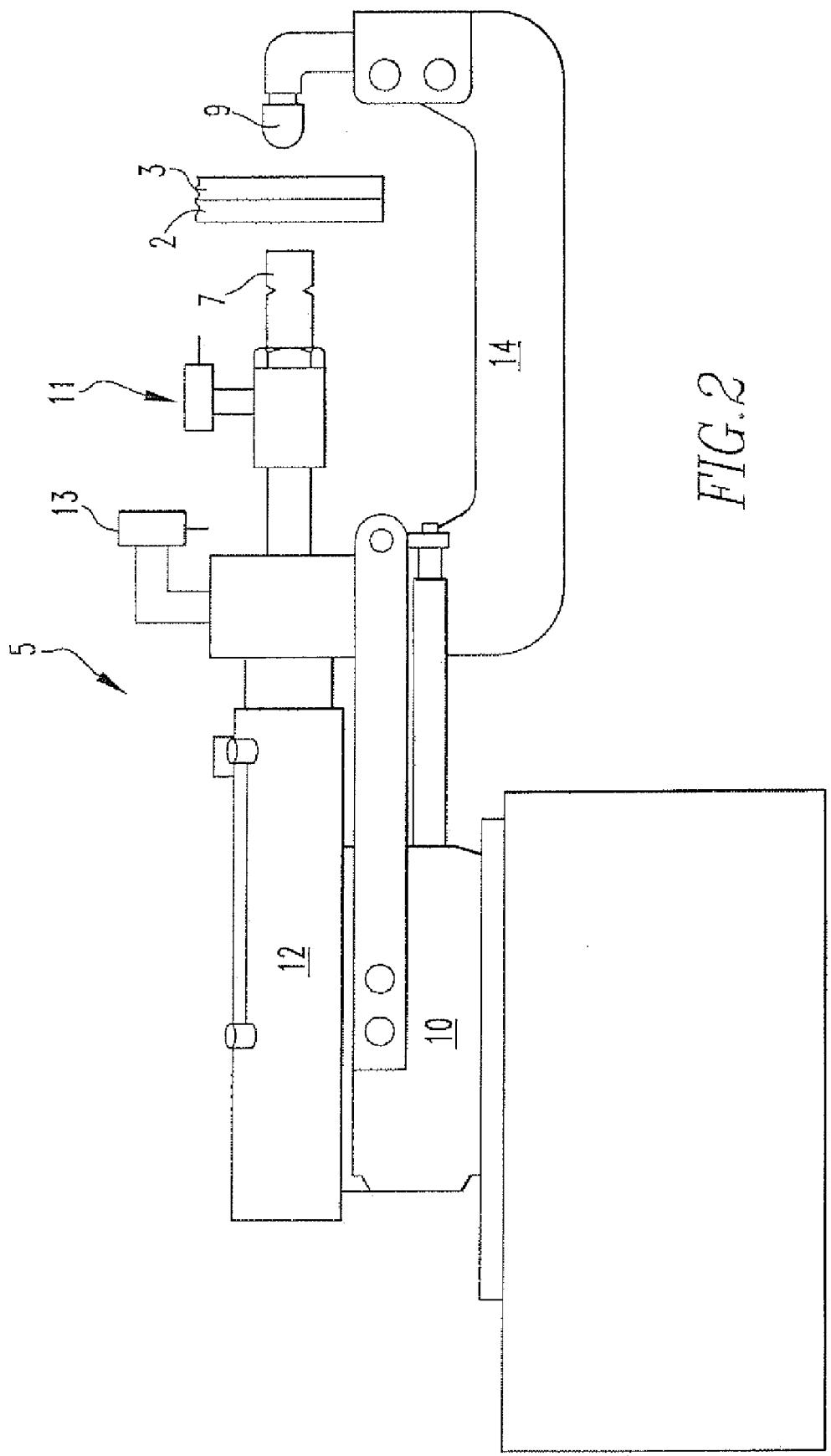
FIG. 2 (three dimensional view) illustrates a resistance welding apparatus.

One example of a resistance welding apparatus is depicted in FIG. 2. The resistance welding apparatus 5 comprises a first electrode 7 positioned to contact a surface of a first metal sheet 2 during current and force application and a second electrode 9 positioned to contact a surface of a second metal sheet 3. The resistance welding apparatus may be orientated so that the first electrode 7 is the upper electrode 9 and the second electrode is the lower electrode. Regardless of orientation, the electrodes are axially aligned in opposition to each other. A large electric current is momentarily passed between the opposing electrodes through the first and at least one other resistive metal sheet that are pressed between them. The sheet metal between the electrodes is briefly fused during current flow and then re-solidified to form an integral weld at the flaying surface between the first and second metal sheets 2 and 3. Although a first and second 2, 3 metal sheet is referred throughout the present disclosure, it is noted that any number of metal sheets may be welded together, such as three metal sheets.

The electrodes utilized in resistance welding may be formed of a material selected from the group consisting of copper based alloys, refractory metals, and dispersion-strengthened copper alloys. The geometry of the electrode may include any geometry consistent with American Welding Society (AWS) standards as listed in the *Recommended Practices for Resistance Welding*. See AWS C1.1M/C1.1:2000. Preferably, the electrode geometry may comprise pointed (AWS Type A), dome (AWS Type B), flat (AWS Type C), offset (AWS Type D), truncated (AWS Type E) or radius (AWS Type F).

Electrode erosion occurs in resistance welding of low resistance metals due to the high current required to weld low resistance metals. The term "low resistance metals" denotes metals halving a sheet resistance on the order of about $1.6 \times 10^{-8}$ $\Omega$*m (silver) to about $10 \times 10^{-8}$ $\Omega$*m (steel/iron). One preferred low resistance metal is aluminum having a sheet resistance on the order of about $2.8\times10^{-8}$ $\Omega$*m (aluminum). The term "high current" denotes a current on the order of about 5,000 Amps to about 100,000 Amps. Although voltage may be adjusted depending on secondary size, in one embodiment the voltage may be on the order of less than 1 volt. Although resistance welding of aluminum is the preferred application, the method is equally applicable to other metals, such as magnesium or steels, including low carbon, high strength, dual phase (DP), transformation induced plasticity (TRIP), and stainless steel. The current applied to welding steel by resistance welding preferably ranges from about 5,000 Amps to about 35,000 Amps, in which the voltage measured at each of the electrode tips may be on the order of less than 1 volt. The weld joint will consist of two or more sheets of similar materials with individual gauges ranging between 0.25 mm to 4.00 mm.

During high current resistance welding, one mechanism of electrode erosion includes the formation of an intermetallic at the contact surface of the electrode. Intermetallics are formed at the electrode tips by deposition of material from the contact surface of the welded material onto the electrode contact surface. When Cu electrodes are applied to welding sheets of Al, the intermetallics typically comprise Cu and Al. The effects of electrode erosion are depicted in FIG. 3.

Figure 3:
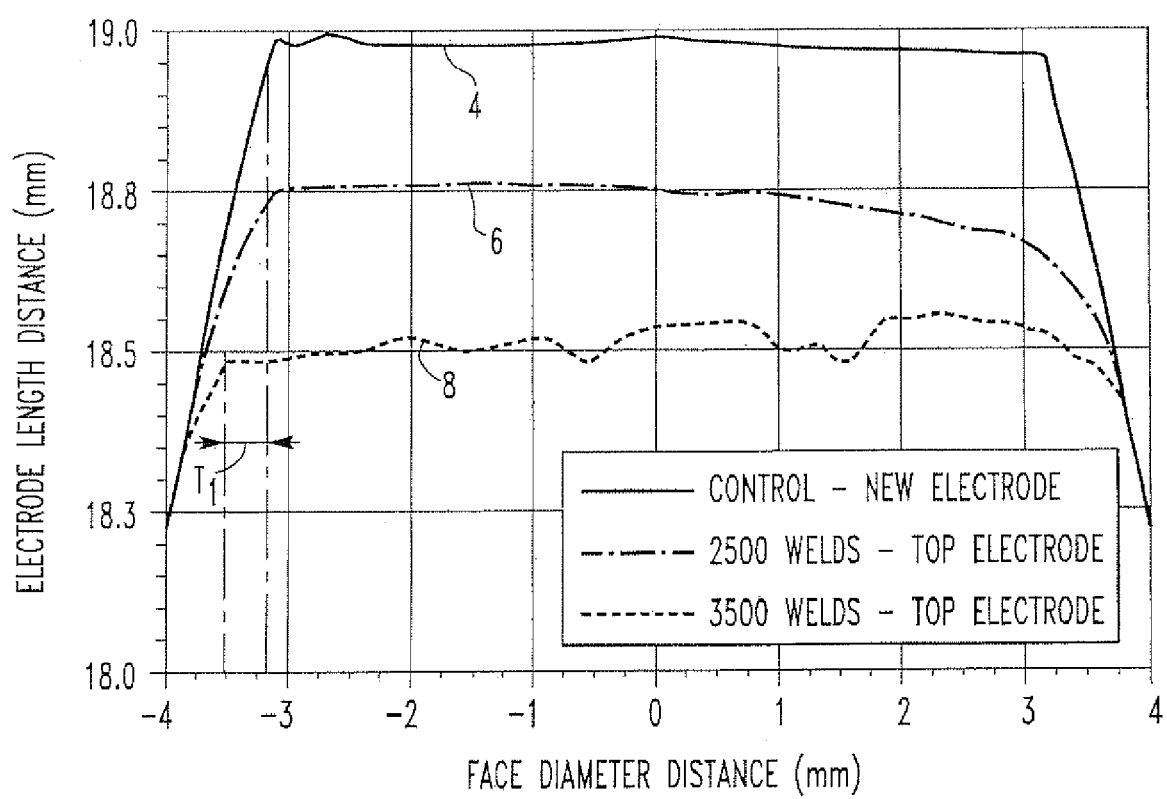
FIG. 3 is a plot of electrode length (mm) vs. electrode face diameter distance (mm) for an electrode utilized to provide 2,500 welds, an electrode utilized to provide 3,500 welds, and a new electrode.

FIG. 3 is a plot that represents the side profile of electrodes that have been used for 2500 welds and 3500 welds. FIG. 3 also includes a control data line to represent a new electrode. The y-axis of the plot represents the length of the electrode from the electrodes base to the contact surface of the electrode. The x-axis represents toe width of the electrode contact surface, wherein 0.0 mm represents the center of the electrodes contact surface diameter. The welds were conducted on 6111-T4 aluminum having a thickness on the order of about 1.0 mm.

Comparing the data lilies for the electrode subjected to 3500 welds (indicated by reference number 8); the data line for the electrode subjected to 2500 welds (indicated by reference number 6); and the control electrode (indicated by reference number 4) clearly illustrate the effects of erosion during the life cycle of the electrodes in resistance welding. More specifically, comparing the electrode that had been subjected to 3500 welds to the control electrode indicates that the length of the electrode has decreased from approximately 19.0 mm to approximately 18.5 mm. More importantly, the difference in electrode contact diameter $T_1$ between the electrode subjected to 3500 welds and the control electrode is greater than 1.0 mm. As discussed above, the increased surface area disadvantageously distributes the force applied through the electrode to a larger contact surface of the metal sheet, effectively distributing the force over a greater area and resulting in a decrease of pressure at the faying surface.

Figure 4:
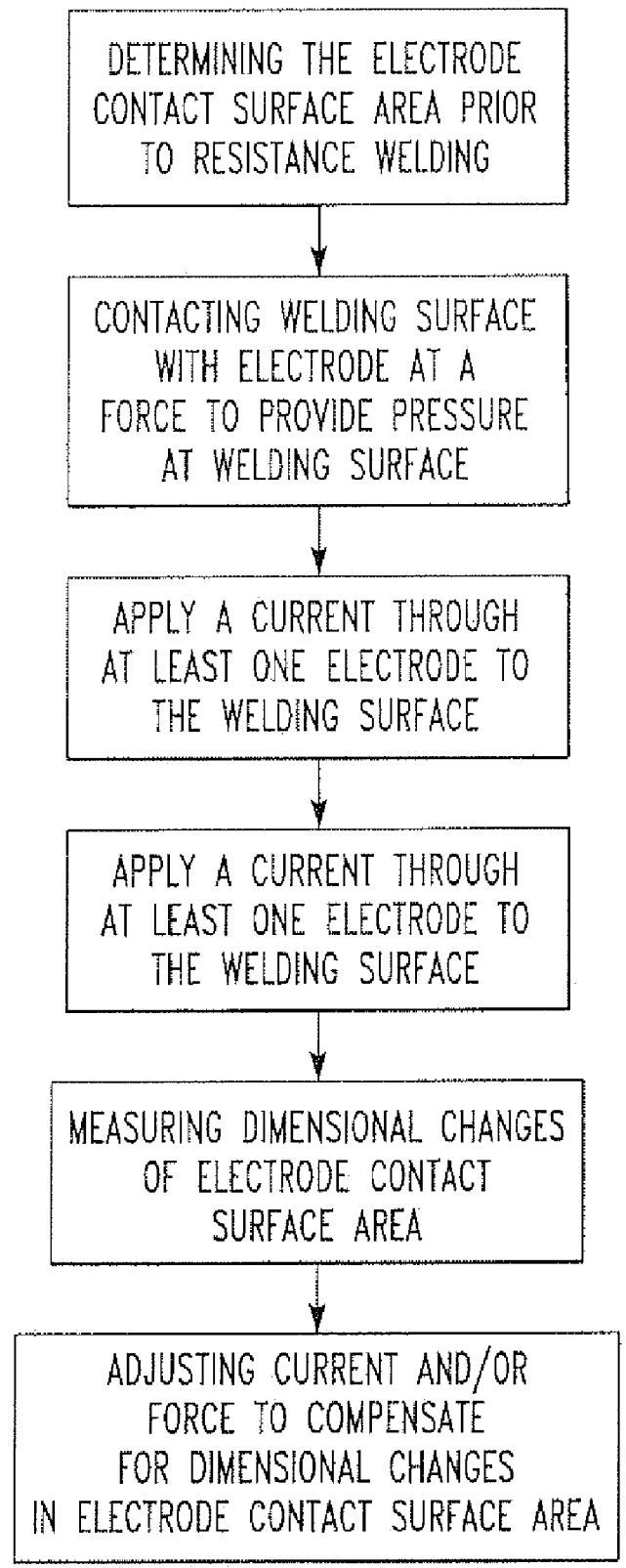
FIG. 4 is a flow chart of the process steps for the inventive method of resistance welding.

Referring to FIG. 4, the present invention overcomes the disadvantages of the prior art by a method that maintains pressure at the faying surface of the welding material by adjusting the electrode force to correspond to changes in the electrode contact surface area. The inventive method begins with measuring or programming the initial electrode contact surface area prior to resistance welding. In one embodiment, as opposed to first measuring the diameter of the electrode, the equipment operator could enter the size into the weld controller at the start of each tip replacement. The metal sheet is then contacted with an electrode having a first contact surface area at a force to provide a pressure to the metal sheet and a current is momentarily applied through the electrode to the metal sheet to form a weld. In a next process step, changes in the contact surface area of the electrode due to erosion are measured. Finally, the electrode force is adjusted to correspond to the changes in the electrode contact surface area in order to maintain pressure to the metal sheet.

In one embodiment of the present invention, changes in surface area of the electrode tip are determined by measuring dimensional changes in the stroke of the resistance welding apparatus arm which applies the electrode to the metal sheet surface to be welded.

Figure 5A:
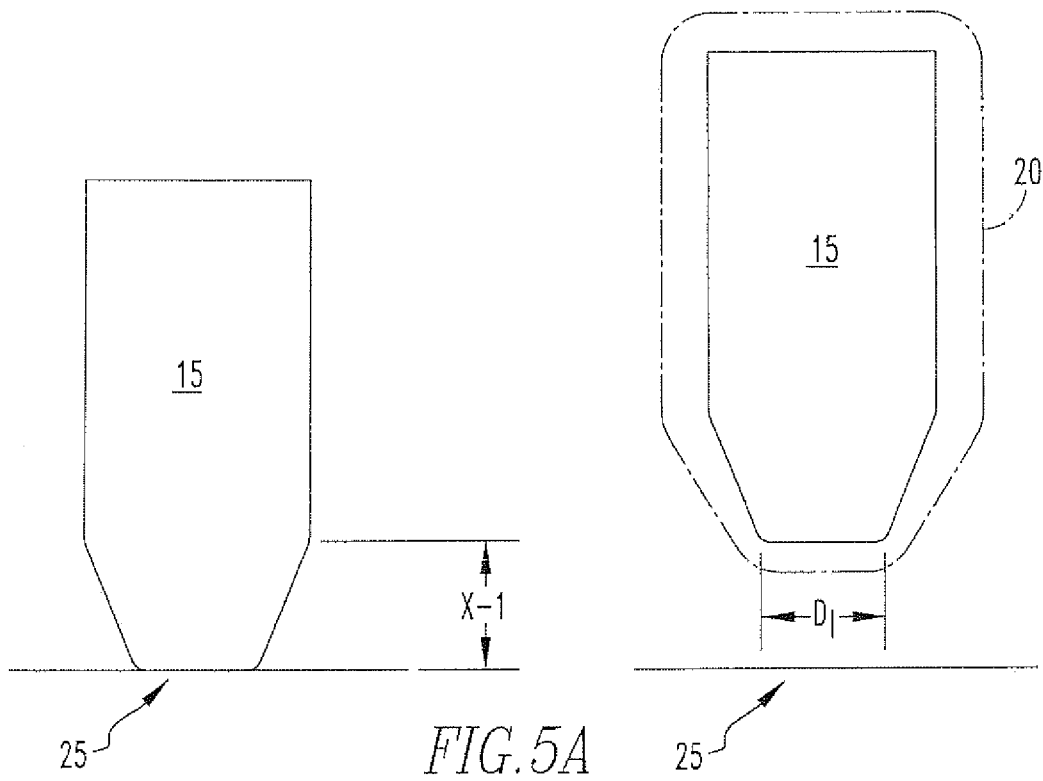
FIGS. 5(a)-(c) (side view) illustrate the relationship between the dimensional changes in the stroke dimension and electrode contact surface diameter.
Figure 5B:
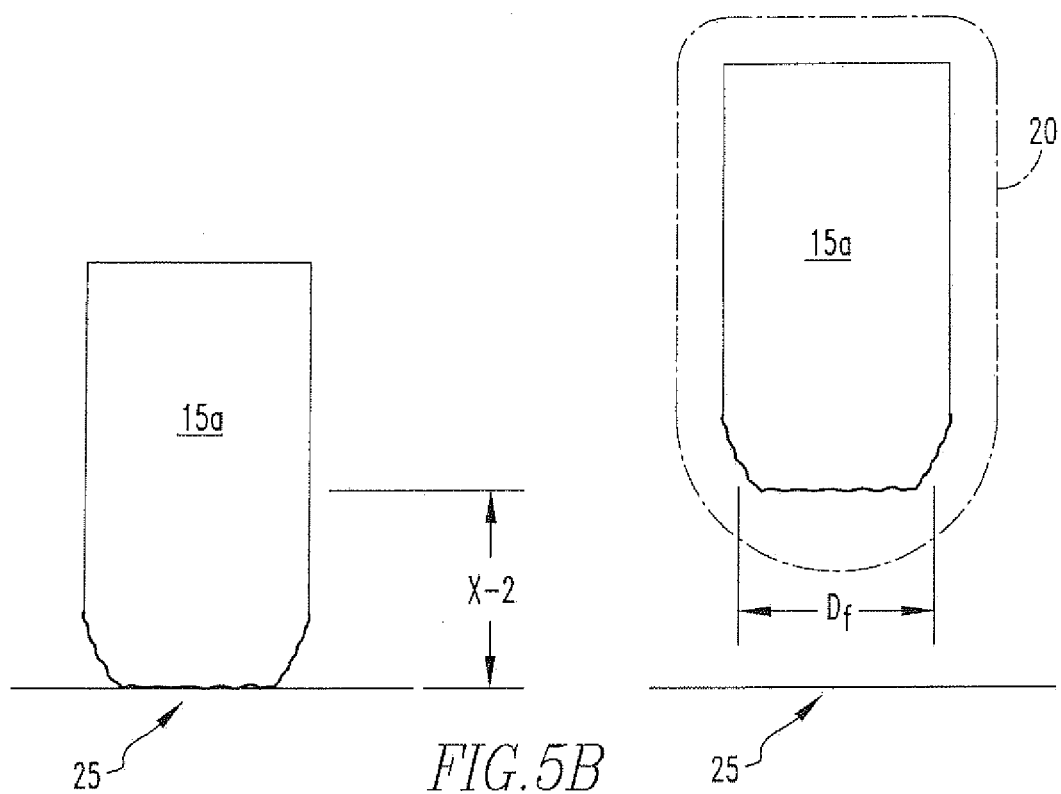
Figure 5C:
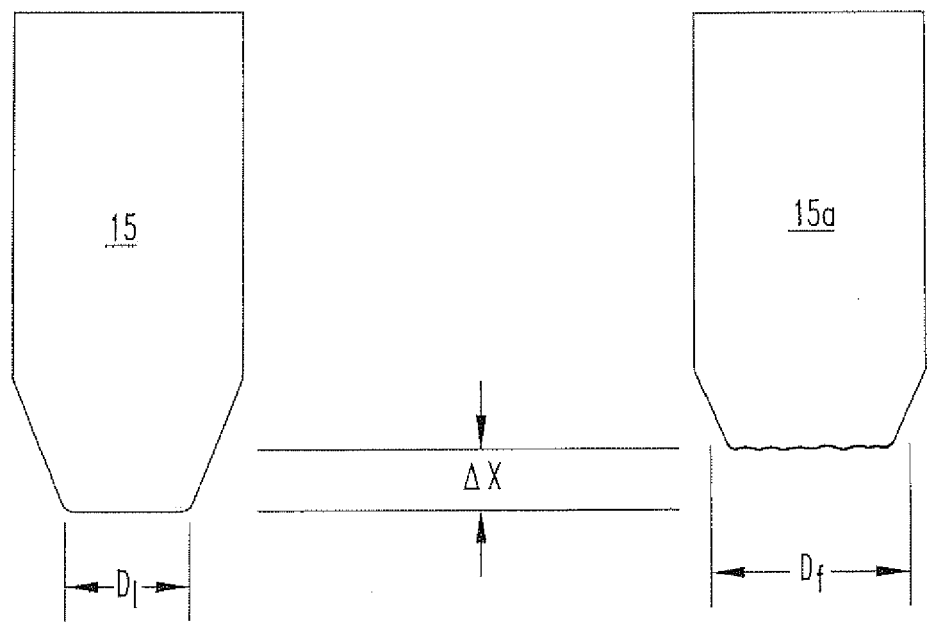

Referring to FIGS. 5(a) and 5(b), the stroke dimension $X_1$, $X_2$ represents the distance the electrode 15, 15a travels between the electrodes starting position 20 and the positioning of the electrode 15 at the flying surface 25 prior to current application. FIG. 5(a) depicts the initial stroke dimension $X_1$ of an electrode prior to erosion. FIG. 5(b) depicts the stroke dimension $X_2$ of the electrode 15a following erosion of the electrode tip, wherein the stroke dimension $X_2$ following erosion is greater than the original stroke dimension $X_1$. Referring to FIG. 5(c), the change in stroke dimension is equal to the difference in the initial stroke dimension $X_1$ and the stroke dimension following electrode erosion, $X_2$ in which the change in stroke dimension is equal to the dimensional change in length of the eroded electrode tip ($\Delta X$).

Referring to FIG. 2, in one embodiment of the present invention, changes in the stroke dimension are measured by a weld cylinder 12, such as pneumatic, electro-servo or hydraulic cylinders, which accurate the electrode 9 to contact the metal sheet 3. In this embodiment, the pneumatic, air over oil, electro-servo or hydraulic cylinders are adapted to measure the stroke dimension for each weld, wherein the stroke dimension for each weld is compared to an initial stroke dimension that was obtained prior to any erosion of the electrode.

Alternatively, dimensional changes in the stroke dimension may be measured using optical, laser, and mechanical measurements of the distance to the contact surface taken from sensors 11 in close proximity to the electrode tip 7. Alternatively, sensors may be mounted in the welding cylinder 12 The sensors may be external or integrally combined with the weld cylinders 12. In one embodiment, the sensor 13 may be mounted to measure the movement of the electrode arm 14 that supports the electrode 9.

Referring to FIGS. 5a and 5b, the change in stroke dimension (dimensional change in the length of the eroded electrode tip ($\Delta X$)) due to electrode erosion is incorporated into a mathematical algorithm to determine the change in surface area of the eroded electrode contact surface, wherein the diameter of the electrode contact surface following electrode erosion $D_f$ is typically greater than the diameter of the electrode contact surface prior to erosion $D_i$.

One example of an algorithm that correlates dimensional changes in stroke dimension (dimensional change in the length of the eroded electrode tip ($\Delta X$)) to increases in electrode contact surface area is the following:

$$D_f \text{ to } D_i \text{ area ratio} = 0.0977\, (\Delta X^2) + 0.625\, (\Delta X) + 1.0$$

$D_i$=initial diameter of the electrode tip of new or dressed electrode $D_f$=diameter of the eroded electrode tip $\Delta X$=difference in stroke dimension The above equation assumes a 45 degree truncated (AWS Type E) electrode. The initial diameter $D_i$ is obtained when a new electrode is placed into the weld station or an electrode dressing operation references the electrode. The above equation has been provided for illustrative purposes only and is not intended to limit the invention.

Using the above equation, changes in the surface area of a 45 degree truncated (AWS Type E) electrode can be computed to correspond to the changes in the stroke dimension ΔX. Referring now to data line 30 in FIG. 6, which depicts a plot of the surface area of the electrode contact surface vs. the change in stroke dimension resulting from electrode erosion, it is noted that as the stroke dimension increases the surface area of the electrode tip increases as well. By determining the increase in the surface area of the electrode tip, the current and/or force applied to the electrode can then be stepped to compensate for the increase in surface area and decrease in applied pressure.

The four tables below cover the vast majority of electrode geometries used in the industry, including but not limited to (AWS Type A, AWS Type B, and AWS Type E). Provided are actual stepping factors plus the regression fit formulas:

TABLE 1

(AWS Type B and AWS Type E):

| Erosion Distance, | Starting Electrode Diameter, mm | | | | | | | | |
|---|---|---|---|---|---|---|---|---|---|
| mm | 4.0 | 5.0 | 6.0 | 7.0 | 8.0 | 9.0 | 10.0 | 11.0 | 12.0 |
| 0.0 | 1.0 | 1.0 | 1.0 | 1.0 | 1.0 | 1.0 | 1.0 | 1.0 | 1.0 |
| 0.1 | 1.1 | 1.1 | 1.1 | 1.1 | 1.1 | 1.0 | 1.0 | 1.0 | 1.0 |
| 0.2 | 1.2 | 1.2 | 1.1 | 1.1 | 1.1 | 1.1 | 1.1 | 1.1 | 1.1 |
| 0.3 | 1.3 | 1.3 | 1.2 | 1.2 | 1.2 | 1.1 | 1.1 | 1.1 | 1.1 |
| 0.4 | 1.4 | 1.3 | 1.3 | 1.2 | 1.2 | 1.2 | 1.2 | 1.2 | 1.1 |
| 0.5 | 1.6 | 1.4 | 1.4 | 1.3 | 1.3 | 1.2 | 1.2 | 1.2 | 1.2 |
| 0.6 | 1.7 | 1.5 | 1.4 | 1.4 | 1.3 | 1.3 | 1.3 | 1.2 | 1.2 |
| 0.7 | 1.8 | 1.6 | 1.5 | 1.4 | 1.4 | 1.3 | 1.3 | 1.3 | 1.2 |
| 0.8 | 2.0 | 1.7 | 1.6 | 1.5 | 1.4 | 1.4 | 1.3 | 1.3 | 1.3 |
| 0.9 | 2.1 | 1.8 | 1.7 | 1.6 | 1.5 | 1.4 | 1.4 | 1.4 | 1.3 |
| 1.0 | 2.3 | 2.0 | 1.8 | 1.7 | 1.6 | 1.5 | 1.4 | 1.4 | 1.4 |
| 1.1 | 2.4 | 2.1 | 1.9 | 1.7 | 1.6 | 1.5 | 1.5 | 1.4 | 1.4 |
| 1.2 | 2.6 | 2.2 | 2.0 | 1.8 | 1.7 | 1.6 | 1.5 | 1.5 | 1.4 |
| 1.3 | 2.7 | 2.3 | 2.1 | 1.9 | 1.8 | 1.7 | 1.6 | 1.5 | 1.5 |
| 1.4 | 2.9 | 2.4 | 2.2 | 2.0 | 1.8 | 1.7 | 1.6 | 1.6 | 1.5 |
| 1.5 | 3.1 | 2.6 | 2.3 | 2.0 | 1.9 | 1.8 | 1.7 | 1.6 | 1.6 |
| 1.6 | 3.2 | 2.7 | 2.4 | 2.1 | 2.0 | 1.8 | 1.7 | 1.7 | 1.6 |
| 1.7 | 3.4 | 2.8 | 2.5 | 2.2 | 2.0 | 1.9 | 1.8 | 1.7 | 1.6 |
| 1.8 | 3.6 | 3.0 | 2.6 | 2.3 | 2.1 | 2.0 | 1.8 | 1.8 | 1.7 |
| 1.9 | 3.8 | 3.1 | 2.7 | 2.4 | 2.2 | 2.0 | 1.9 | 1.8 | 1.7 |
| 2.0 | 4.0 | 3.2 | 2.8 | 2.5 | 2.3 | 2.1 | 2.0 | 1.9 | 1.8 |

TABLE 2

(AWS Type B, and AWS Type E):

| Starting Electrode Diameter, mm | Force Stepping Factor Formula |
|---|---|
| 4.0 | $y = 0.0278\Delta x^2 + 0.3333\Delta x + 1$ |
| 5.0 | $y = 0.0331\Delta x^2 + 0.3636\Delta x + 1$ |
| 6.0 | $y = 0.04\Delta x^2 + 0.4\Delta x + 1$ |
| 7.0 | $y = 0.0494\Delta x^2 + 0.4444\Delta x + 1$ |
| 8.0 | $y = 0.0625\Delta x^2 + 0.5\Delta x + 1$ |
| 9.0 | $y = 0.0816\Delta x^2 + 0.5714\Delta x + 1$ |
| 10.0 | $y = 0.1111\Delta x^2 + 0.6667\Delta x + 1$ |
| 11.0 | $y = 0.16\Delta x^2 + 0.8\Delta x + 1$ |
| 12.0 | $y = 0.25\Delta x^2 + \Delta x + 1$ | where ΔX is difference in stroke dimension measured in reference to the initial starting condition i.e. new or post tip dressing and y is the factor increase of the force to maintain constant pressure to the initial condition.

TABLE 1

(AWS Type A):

| Erosion Distance, | Starting Electrode Diameter, mm | | | | | | | | |
|---|---|---|---|---|---|---|---|---|---|
| mm | 4.0 | 5.0 | 6.0 | 7.0 | 8.0 | 9.0 | 10.0 | 11.0 | 12.0 |
| 0.0 | 1.0 | 1.0 | 1.0 | 1.0 | 1.0 | 1.0 | 1.0 | 1.0 | 1.0 |
| 0.1 | 1.1 | 1.0 | 1.0 | 1.0 | 1.0 | 1.0 | 1.0 | 1.0 | 1.0 |
| 0.2 | 1.1 | 1.1 | 1.1 | 1.1 | 1.1 | 1.1 | 1.0 | 1.0 | 1.0 |
| 0.3 | 1.2 | 1.1 | 1.1 | 1.1 | 1.1 | 1.1 | 1.1 | 1.1 | 1.1 |
| 0.4 | 1.2 | 1.2 | 1.2 | 1.1 | 1.1 | 1.1 | 1.1 | 1.1 | 1.1 |
| 0.5 | 1.3 | 1.2 | 1.2 | 1.2 | 1.1 | 1.1 | 1.1 | 1.1 | 1.1 |
| 0.6 | 1.4 | 1.3 | 1.2 | 1.2 | 1.2 | 1.2 | 1.1 | 1.1 | 1.1 |
| 0.7 | 1.4 | 1.3 | 1.3 | 1.2 | 1.2 | 1.2 | 1.2 | 1.2 | 1.1 |
| 0.8 | 1.5 | 1.4 | 1.3 | 1.3 | 1.2 | 1.2 | 1.2 | 1.2 | 1.2 |
| 0.9 | 1.6 | 1.5 | 1.4 | 1.3 | 1.3 | 1.2 | 1.2 | 1.2 | 1.2 |
| 1.0 | 1.7 | 1.5 | 1.4 | 1.4 | 1.3 | 1.3 | 1.2 | 1.2 | 1.2 |
| 1.1 | 1.7 | 1.6 | 1.5 | 1.4 | 1.3 | 1.3 | 1.3 | 1.2 | 1.2 |
| 1.2 | 1.8 | 1.6 | 1.5 | 1.4 | 1.4 | 1.3 | 1.3 | 1.3 | 1.2 |
| 1.3 | 1.9 | 1.7 | 1.6 | 1.5 | 1.4 | 1.4 | 1.3 | 1.3 | 1.3 |
| 1.4 | 2.0 | 1.8 | 1.6 | 1.5 | 1.4 | 1.4 | 1.3 | 1.3 | 1.3 |
| 1.5 | 2.1 | 1.8 | 1.7 | 1.6 | 1.5 | 1.4 | 1.4 | 1.3 | 1.3 |
| 1.6 | 2.1 | 1.9 | 1.7 | 1.6 | 1.5 | 1.5 | 1.4 | 1.4 | 1.3 |
| 1.7 | 2.2 | 1.9 | 1.8 | 1.6 | 1.6 | 1.5 | 1.4 | 1.4 | 1.4 |
| 1.8 | 2.3 | 2.0 | 1.8 | 1.7 | 1.6 | 1.5 | 1.5 | 1.4 | 1.4 |
| 1.9 | 2.4 | 2.1 | 1.9 | 1.7 | 1.6 | 1.5 | 1.5 | 1.4 | 1.4 |
| 2.0 | 2.5 | 2.1 | 1.9 | 1.8 | 1.7 | 1.6 | 1.5 | 1.5 | 1.4 |

TABLE 2

(AWS Type A):

| Starting Electrode Diameter, mm | Force Stepping Factor Formula |
|---|---|
| 4.0 | $y = 0.0833\Delta x^2 + 0.5774\Delta x + 1$ |
| 5.0 | $y = 0.0533\Delta x^2 + 0.4619\Delta x + 1$ |
| 6.0 | $y = 0.037\Delta x^2 + 0.3849\Delta x + 1$ |
| 7.0 | $y = 0.0272\Delta x^2 + 0.3299\Delta x + 1$ |
| 8.0 | $y = 0.0208\Delta x^2 + 0.2887\Delta x + 1$ |
| 9.0 | $y = 0.0165\Delta x^2 + 0.2566\Delta x + 1$ |
| 10.0 | $y = 0.0133\Delta x^2 + 0.2309\Delta x + 1$ |
| 11.0 | $y = 0.011\Delta x^2 + 0.2099\Delta x + 1$ |
| 12.0 | $y = 0.0093\Delta x^2 + 0.1925\Delta x + 1$ | where x is the erosion of the electrode measured in reference to the initial starting condition, i.e. new or post tip dressing and y is the factor increase of the force to maintain constant pressure to the initial condition.

For example, when the electrodes are AWS Type A, starting electrode diameter is 4.0 mm, and electrode erodes by 1 mm, then the force stepping factor formula is y=(0.0833)(1.0)²+0.5774(1.0)+1=0.0833+0.5774+1=1.6607. When the initial force applied is a unit load (1 lb), then the force applied to the next weld cycle is 1 lb×1.6607=1.667 lb.

Figure 7:
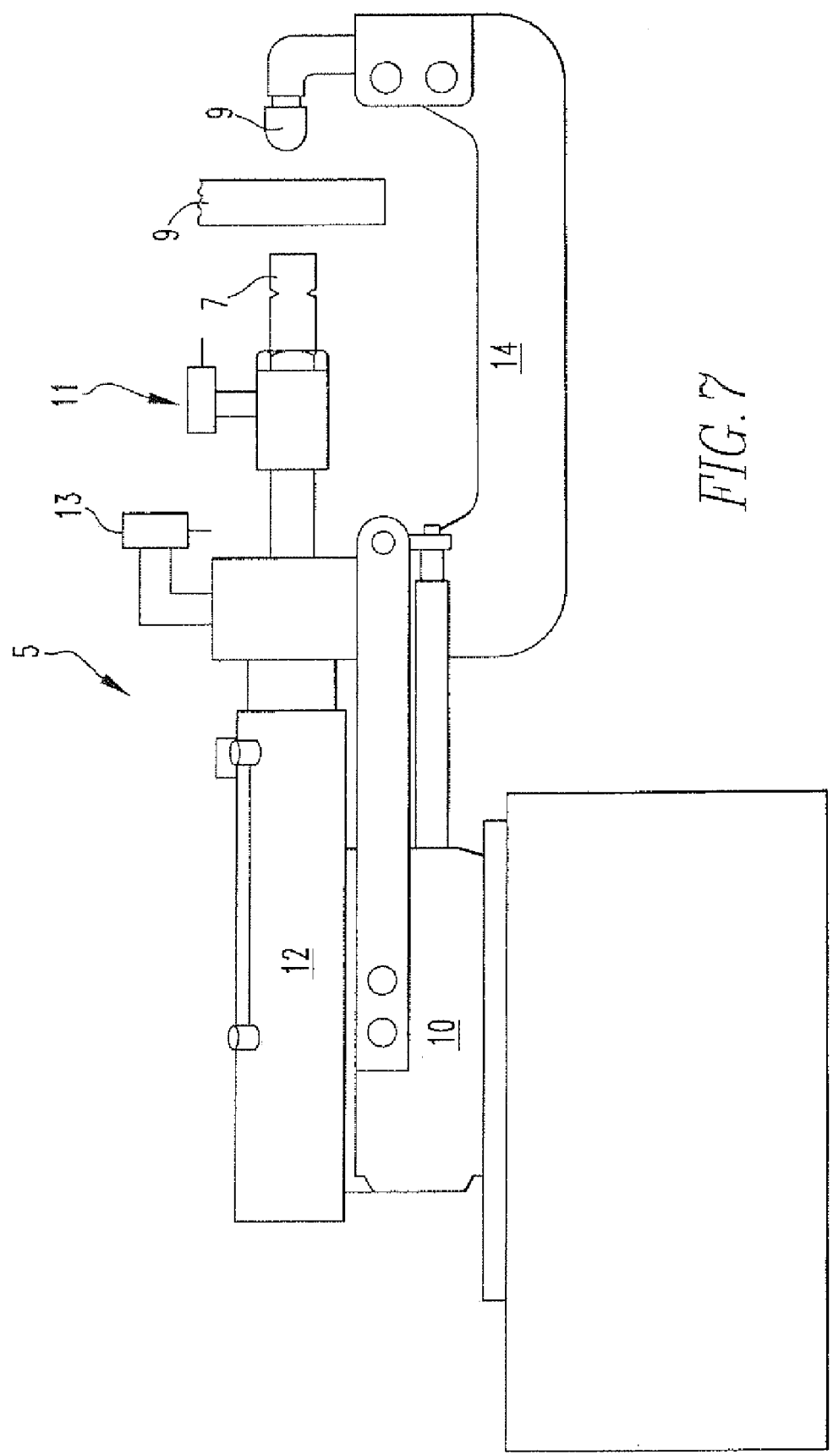
FIG. 7 depicts one embodiment of the present invention in which the electrode contact surface is measured by a pressure sensitive pad.

In another embodiment, the surface area of the electrode contact surface is directly Measured using optical methods. In a further embodiment of the present invention, the surface area of the electrode tip is determined by making an impression of the electrode contact surface on a work piece separate from the welded metal sheets and then measuring the changes in the electrode contact surface from the impression on the workpiece. Referring to FIG. 7, in another embodiment, the surface area of the electrode contact surface 7, 9 is measured by contacting the electrode contact surface 7,9 to a pressure sensitive pad 16, which can then provide feedback to the weld controller.

Once the surface area changes of the electrode contact surface are measured, the force applied to the metal sheet through the electrode and/or the current applied to the metal sheet is stepped to compensate for the increasing surface area of the electrode tip. The increasing surface area of the electrode contact surface disadvantageously distributes the force applied through the electrode to a larger surface of the metal sheet resulting in a decrease of applied pressure to the faying surface. Therefore, in order to maintain the optimum pressure at the faying surface the electrode face must be stepped to compensate for the increasing surface area of the eroding electrode tip.

Stepping is a process where the force is incrementally increased to maintain a desired pressure at the faying surface during the welding process. The step increment correlates to increases in electrode contact surface area. This value can be calculated for each welding operation or periodically after a specified number of operations. The calculation can be performed before, during or after the welding operations. Additionally, the current may also be stepped to further increase the electrode lifetime prior to forming discrepant welds. After the step value is obtained, subsequent welds may have the current and force setpoint values changed according to the user's performance. Critical processes may change the force and current values to maintain the original current density and pressure. Less sensitive applications may change the force and current values such that the current density and pressure do not fall below a predefined level.

Figure 6:
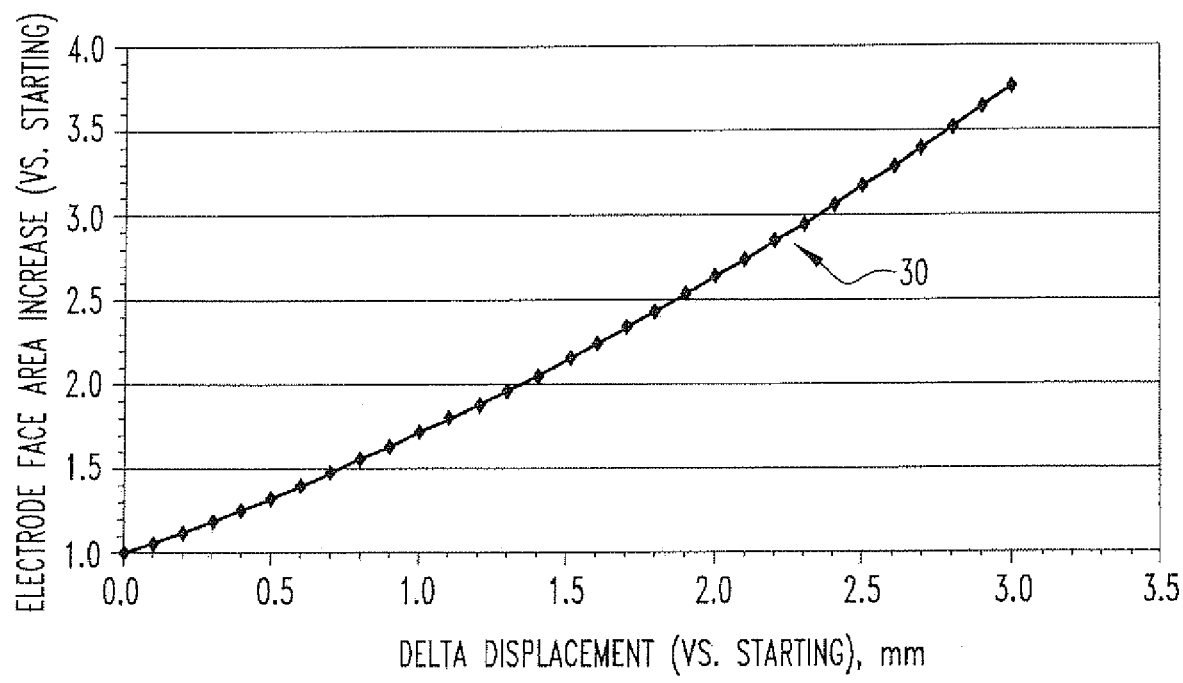
FIG. 6 is a plot that illustrates the relationship between stroke dimension and electrode contact surface area for an eroding electrode.
Figure 6A:
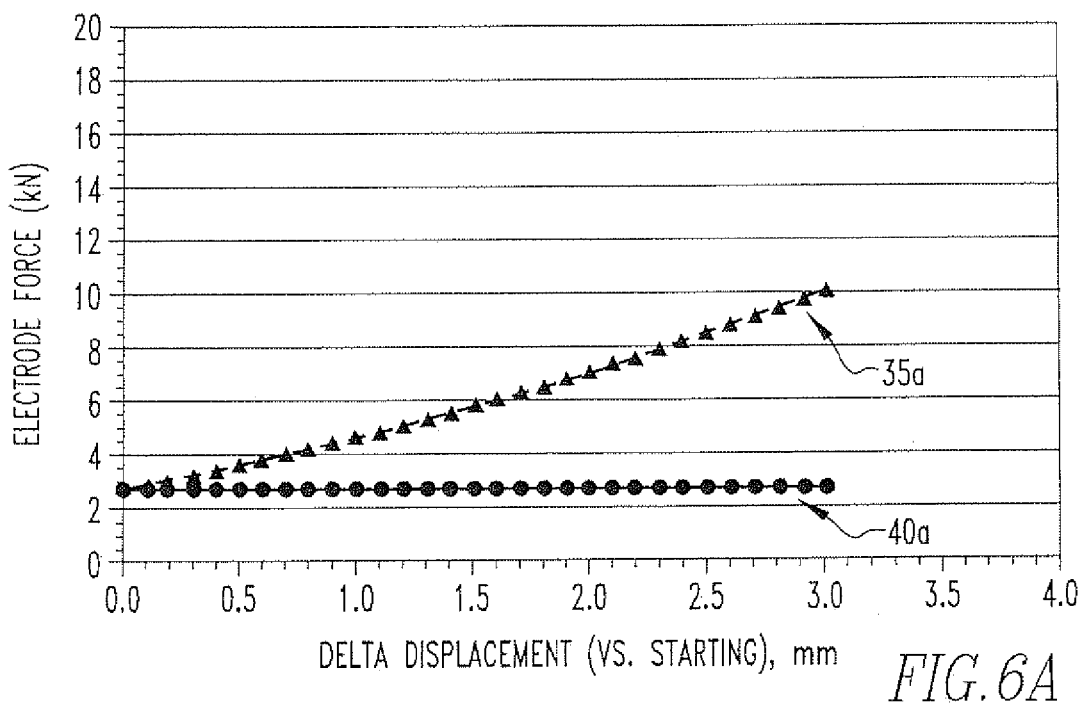
FIG. 6(a) is a plot of electrode force vs. changes in stroke dimension, in which one data line maintains a constant electrode force and a second data line incrementally increases (steps) the electrode force.
Figure 6B:
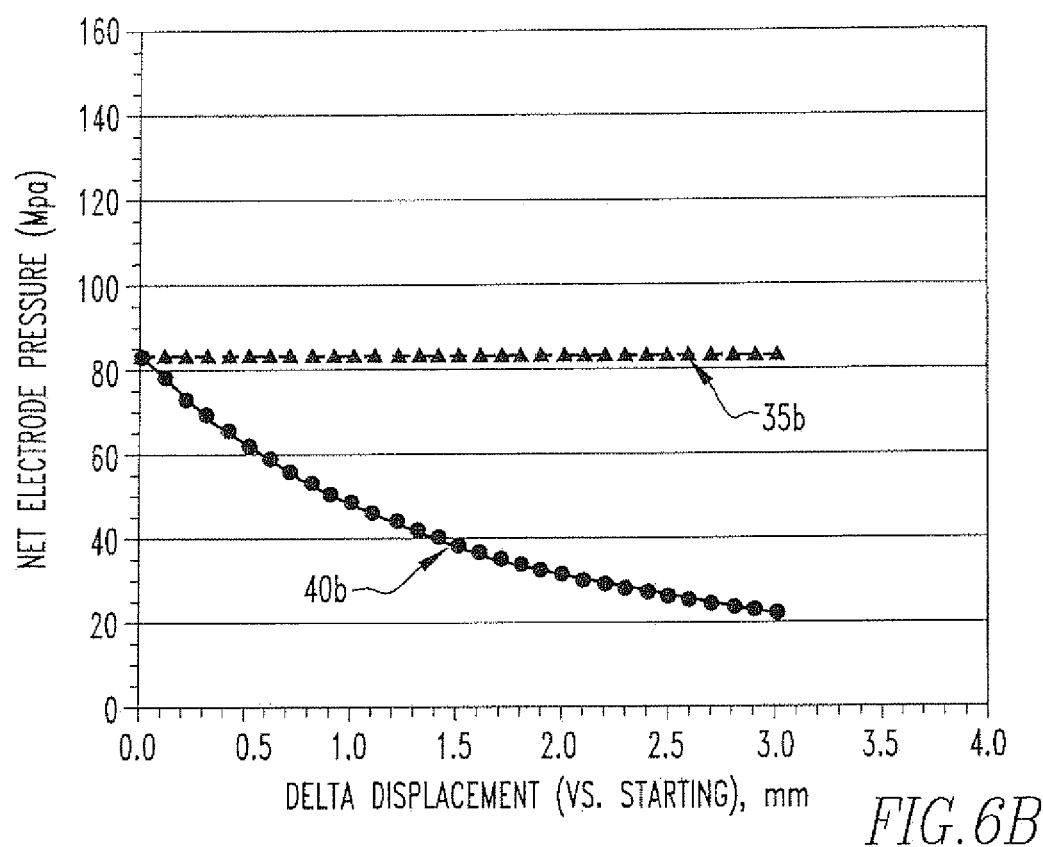
FIG. 6(b) is a plot that depicts the pressure produced at the faying surface by electrodes that apply a constant electrode force and electrodes that apply an increasing electrode force (depicted in FIG. 6(a))

It is noted that force and current may be stepped either together or independently. The effects of stepping electrode force is illustrated in FIGS. 6(*a*) and 6(*b*). FIG. 6(*a*) is a plot the electrode force vs. changes in the stroke dimension, wherein data line 40*a* represents a constant electrode force and data line 35*a* represents stepping of the electrode force. FIG. 6(*b*) is a plot of the pressure produced at the faying surface of the welded material vs. the change in stroke dimension by the electrode applying a constant electrode force (data line 40*b*) and by an electrode applying a stepped electrode force (data line 35*b*). Still referring to FIG. 6(*b*), it is noted that when the electrode force is constant and the stroke dimension increases the pressure applied to the faying surface decreases. Stepping the electrode force to compensate for the increases in stroke dimension serves to stabilize the pressure applied to the faying surface, as indicated by data line 35*b*. By stabilizing the pressure at the faying surface the life cycle of the electrodes may be increased and the incidence of discrepant welds decreased.

Figure 8:
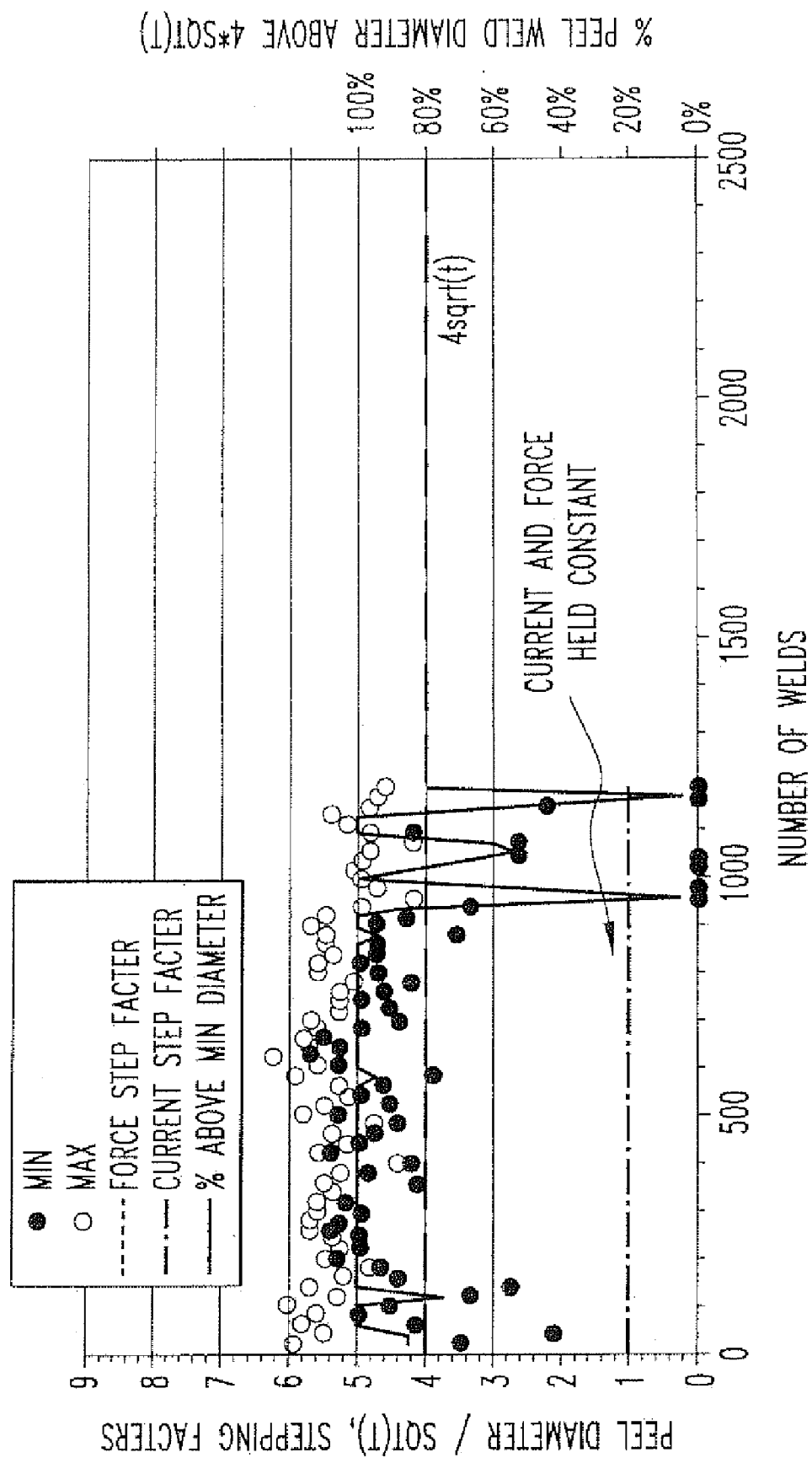
FIG. 8 depicts a plot of the number of welds performed vs. the peel diameter of the welds produced for a resistance welding process, wherein the electrode force and the current are constant.
Figure 9:
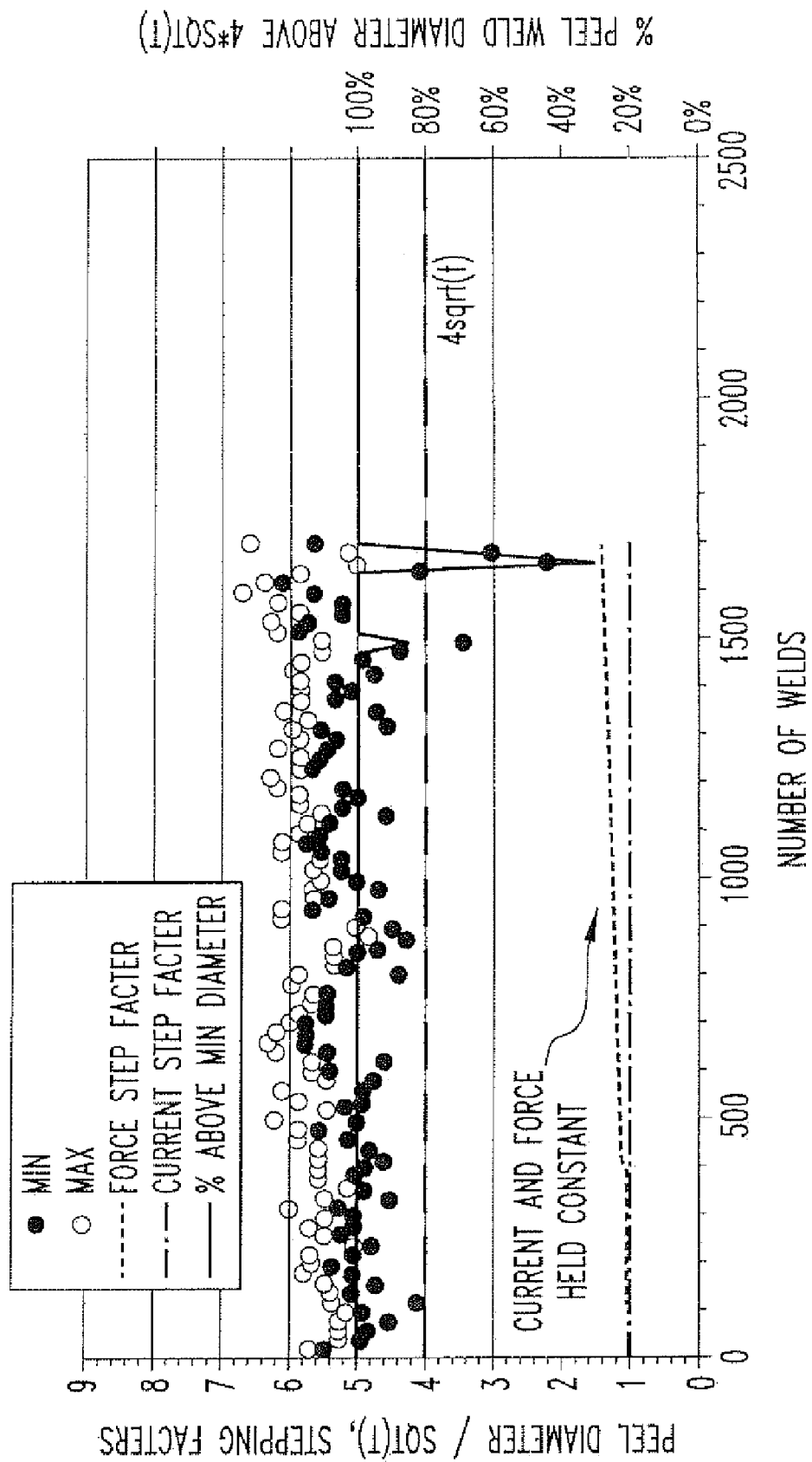
FIG. 9 depicts a plot of the number of welds performed vs. the peel diameter of the welds produced for a resistance welding process, wherein the current applied through the electrode is incrementally stepped.
Figure 10:
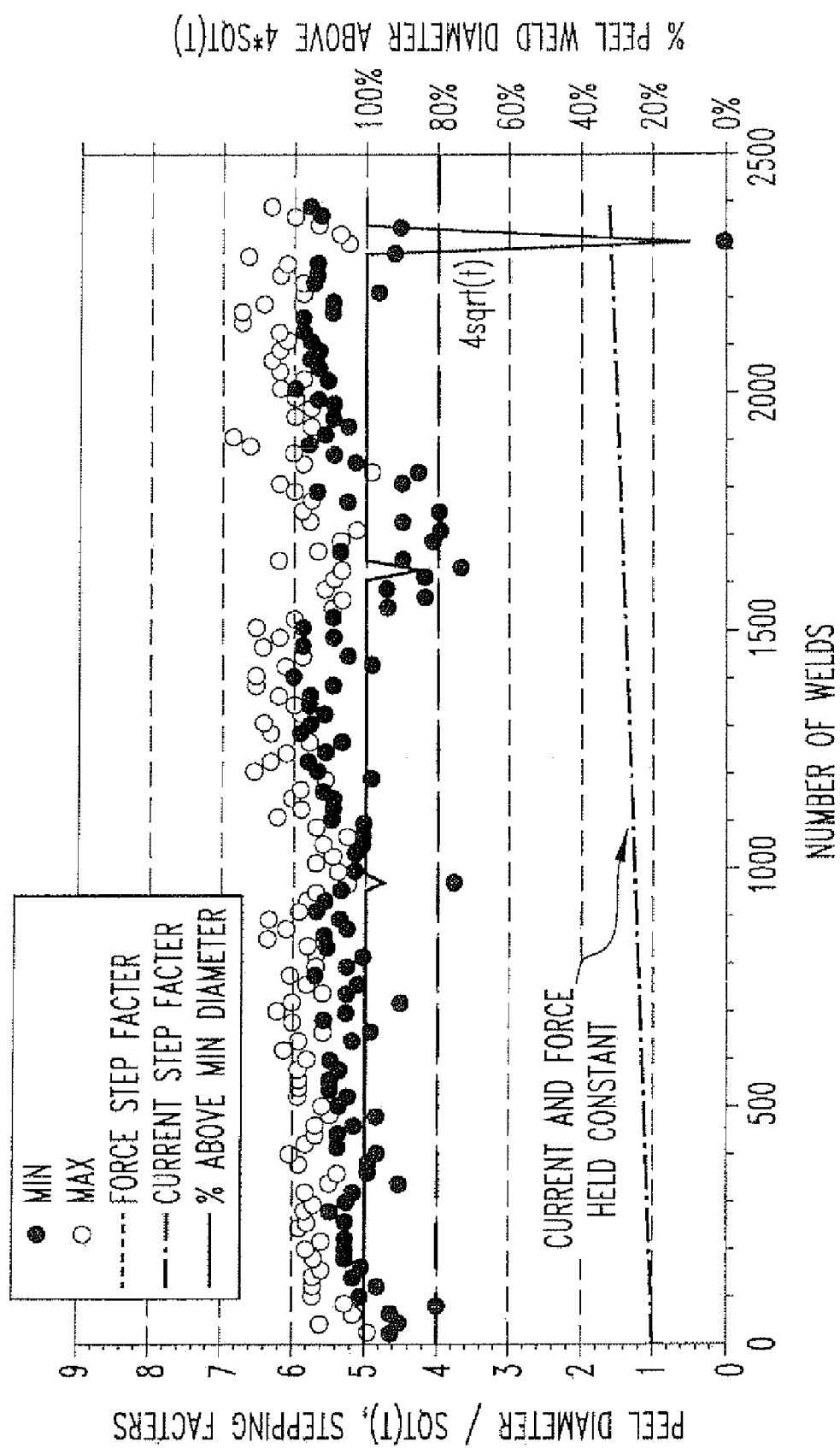
FIG. 10 depicts a plot of the number of welds performed vs. the peel diameter of the welds produced for a resistance welding process, wherein the electrode force and the current applied through the electrode is incrementally stepped.

The advantages of stepping the force to correspond to changes in the surface area of the electrodes are best described with reference to FIGS. 8-10. FIGS. 8-10 depict plots of the Number of welds vs. peel diameter/sqrt(t), wherein a discrepant weld is formed when the peel diameter/sqrt(t) drops to a value on the order of about 4.0 or less. The peel diameter/sqrt(t) represents normalized data for the peel diameter in which discrepant welds are created when the weld diameter is not greater than four multiplied by the square moot of the thickness of the sheet (sheet gauge) being welded. For example, in the data provided in FIGS. 8-10, in which the thickness of the sheets being welded is 1.0 mm, discrepant welds are formed when the weld diameter is less than 4.0 mm.

FIG. 8 is a plot of the number of welds performed vs. the peel diameter of the welds produced for a resistance welding process, in which the electrode force and the current are held constant throughout the life cycle of the electrode. FIG. 8 clearly depicts that the peel diameter decreases to a level that would produce discrepant welds at approximately 900 welds.

FIG. 9 is a plot of the number of welds performed vs. the peel diameter of the welds produced for a resistance welding process in which the current applied through the electrode is incrementally stepped during the life cycle of the electrode. FIG. 9 clearly discloses that by stepping the current to correspond to electrode erosion the life cycle of the electrodes may be increased to greater than 1600 welds without forming discrepant welds.

FIG. 10 is a plot of the number of welds performed vs. the peel diameter of the welds produced for a resistance welding process ill which the electrode force and the current applied through the electrode are incrementally stepped during the life cycle of the electrode. FIG. 10 clearly discloses that by stepping the force and the current to correspond to electrode erosion the life cycle of the electrodes may be increased to greater than about 2300 welds without forming discrepant welds. An example of stepping the electrode current and electrode force is provided in the table depicted in FIG. 11.

Figure 12A:
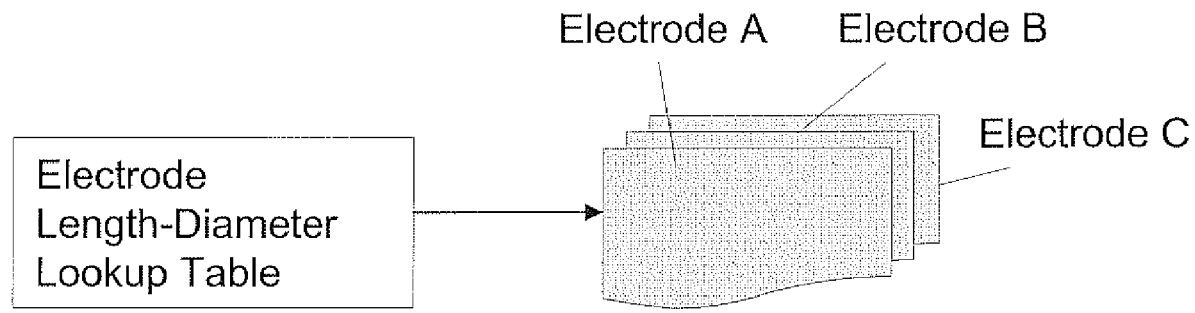
FIG. 12A illustrates that different types electrodes can have different length-to-diameter characteristics.
Figure 12B:
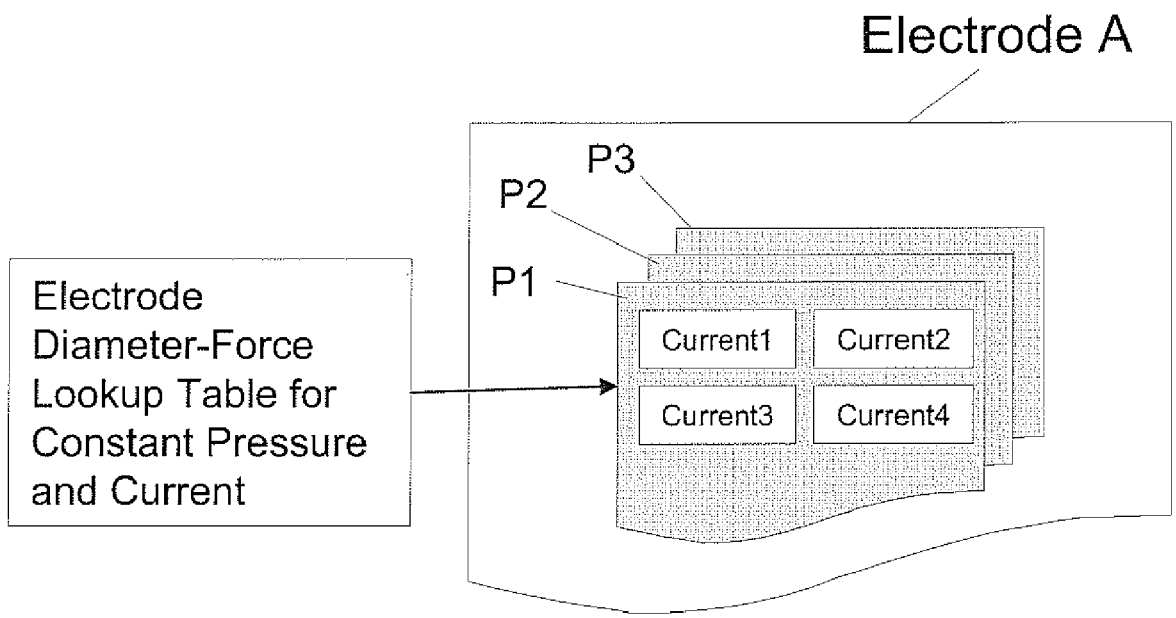
FIG. 12B illustrates that each type of electrodes can have diameter-to-force characteristics for constant pressure and current.

Another embodiment of the present invention includes weld controller logic to analysis changes of the electrode stroke to determine a new higher force to be applied to the electrode tips to reproduce the pressure on to the work pieces while maintaining the initial current. The cost of increasing the force is less than the cost of increasing the current between weld cycles or current stepping in increments of welds performed (e.g., after every 100 welds). One process Is to define materials and material thicknesses to be welded. Each material (e.g., steel, aluminum) will produce a different weld which is affected by the electrode, weld pressure, force, and current. Each Electrode type has a predetermined length, length-diameter ratio, and a diameter-force characteristic that can be arranged in lookup tables. FIG. 12A illustrates that different types electrodes can have different length-to-diameter characteristics. FIG. 12B illustrates that each type of electrodes can have diameter-to-force characteristics for, constant pressure and current.

For example, a weld controller can be operably connected to at least one pair of electrodes, each electrode of the at least one pair of electrodes having a tip and a length, the weld controller having an initialization program including an electrode type, an initial electrode length, a pressure, a current, a force, and a current stepper ratio 1:1 without incremental increases in current; a plurality of electrode length to Force lookup tables for contant pressures and constant currents for a plurality of electrode types; an electrode stroke distance program to determine a new length of the at least one pair of electrodes in response to a signal including an electrode stroke distance at each of a plurality of weld cycles; and an electrode force program to access the plurality of electrode length to force lookup tables to determine a new force to be applied by the tips onto at least two workpieces to reproduce the pressure at the current. The weld controller will transmit the new force to the at least one pair of electrodes prior to each weld cycle.

Figure 13:
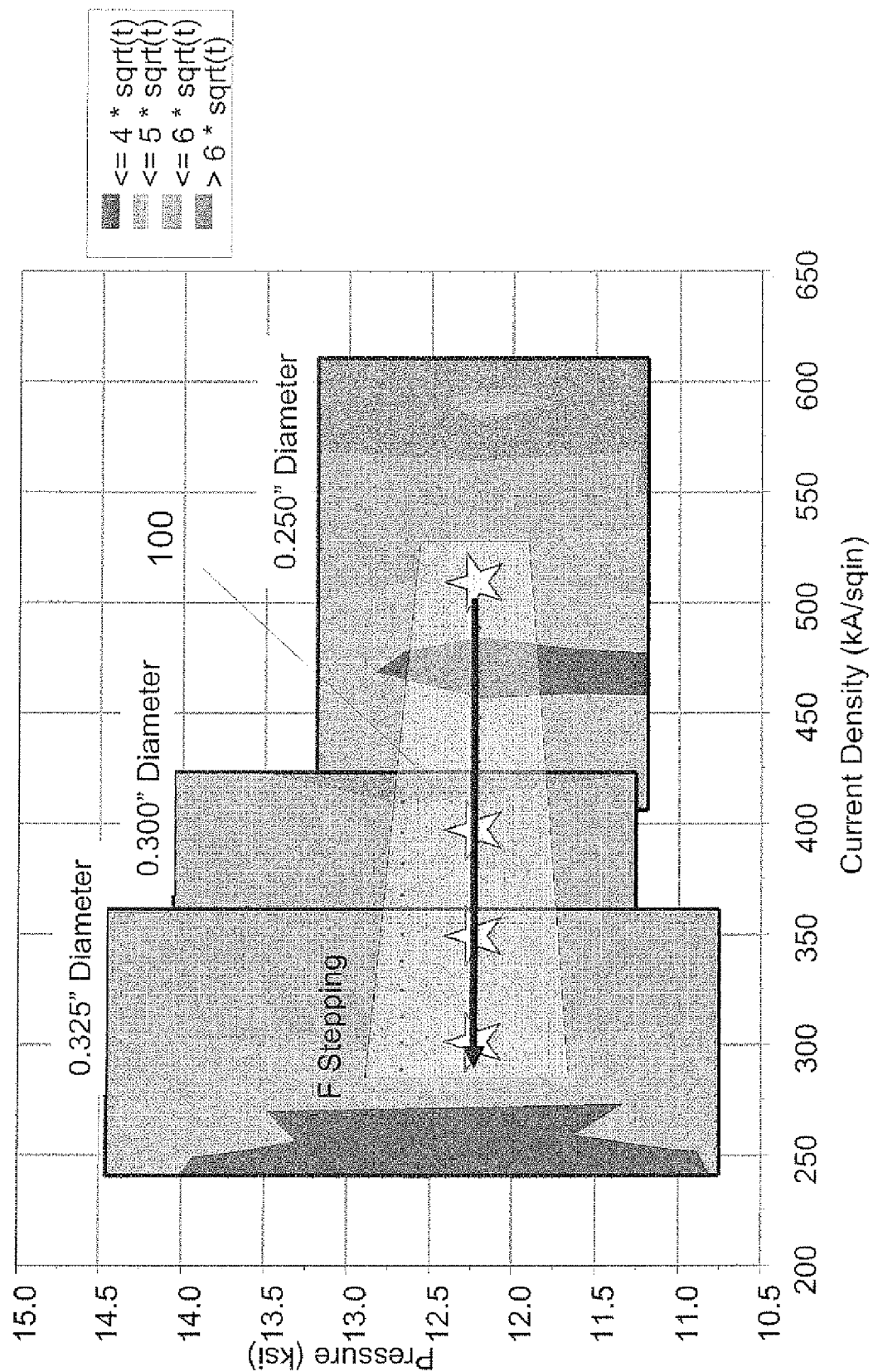
FIG. 13 illustrates that the current density decreases as the electrode diameter increases and the pressure contact on the work pieces remains constant.

One attribute of this embodiment of the present invention is that current density does not have to be controlled. FIG. 13 illustrates that the current density decreases as the electrode diameter increases (in the direction of the arrow) and the pressure contact on the work pieces remains constant. Whereas, the current density remaining constant with current stepping by increasing the current to compensate for the increasing electrode diameter and the pressure contact on the work pieces decreases. One embodiment of the present invention will adjust the force to target a pressure and current density within Zone 100 for optimum results.

The above described alterative embodiment of the present invention can be installed in a production line of, for example, an automotive assembly line, having the following steps:

a. providing a pat of electrodes, wherein an electrode of the pair of electrodes comprises a tip, a tip surface area, a length, and a plurality of diameters along the length, wherein the electrode tip surface area is substantially proportional to a diameter of the plurality of diameters relative to the electrode length as the electrode tip erodes;

b. determining a pressure and a current for a weld cycle of a welding operation;

c. developing a relationship between an electrode force with the electrode length as the electrode tip erodes to substantially maintain the pressure for the weld cycle;

d. contacting a metal sheet with the electrode, e. applying the electrode force associated with the length of the electrode to provide the predetermined pressure to the metal sheet;

f. measuring a stroke dimension of the electrode, wherein the stroke dimension is a distance from a reference point of the electrode to a contact surface of the metal sheet prior to applying the electrode current;

g. applying the electrode current through the electrode to the metal sheet to generate a weld, a new tip surface area of the electrode, a new electrode length, and a new contact surface of the metal sheet;

h. measuring a new stroke dimension, wherein the new stroke dimension is a distance from the reference point of the electrode to the new contact surface of the metal sheet;

i. determining the new electrode length, wherein the new electrode length equals the electrode length less the difference of the new stroke dimension and the stroke dimension; and j. repeating steps d-i to substantially maintain the pressure for subsequent weld cycles until completion of the welding operation with out increasing the current, whereby, the electrode force is adjusted for each weld cycle to compensate for the change in the electrode tip surface area as the electrode erodes.

While the present invention has been particularly shown and described within respect to preferred embodiments thereof, it will be understood by those skilled in the art that the foregoing and other changes in forms and details may be made without departing from the spirit and scope of the present invention. It is therefore intended that the present invention not be limited to the exact forms and details described and illustrated, but fall within the scope of the appended claims.

What is claimed is:

1. A production line method of spot welding comprising the steps of:

a. providing a pair of electrodes, wherein an electrode of the pair of electrodes comprises a tip, a tip surface area, a length, and a plurality of diameters along the length, wherein the electrode tip surface area is substantially proportional to a diameter of the plurality of diameters relative to the electrode length as the electrode tip erodes;

b. determining a pressure and a current for a weld cycle of a welding operation;

c. developing a relationship between an electrode force with the electrode length as the electrode tip erodes to substantially maintain the pressure for the weld cycle;

d. contacting a metal sheet with the electrode;

e. applying the electrode force associated with the length of the electrode to provide the predetermined pressure to the metal sheet;

f. measuring a stroke dimension of the electrode, wherein the stroke dimension is a distance from a reference point of the electrode to a contact surface of the metal sheet prior to applying the electrode current;

g. applying the electrode current through the electrode to the metal sheet to generate a weld, a new tip surface area of the electrode, a new electrode length, and a new contact surface of the metal sheet;

h. measuring a new stroke dimension, wherein the new stroke dimension is a distance from the reference point of the electrode to the new contact surface of the metal sheet;

i. determining the new electrode length, wherein the new electrode length equals the electrode length less the difference of the new stroke dimension and the stroke dimension; and j. repeating steps d-i to substantially maintain the pressure for subsequent weld cycles until completion of the welding operation without increasing the current, whereby, the electrode force is adjusted for each weld cycle to compensate for the change in the electrode tip surface area as the electrode erodes.

2. A method of welding comprising:

i. contacting a metal sheet with at least one electrode having all electrode tip with an electrode diameter at a force to provide a pressure to a contact surface of the metal sheet, wherein the electrode diameter has a starting position displaced from the contact surface by a stroke dimension, wherein the stroke dimension is equal to a difference in the starting position and a position of the electrode tip when the electrode tip makes contact to the contact mixture of the metal sheet;

ii. applying a current through the at least one electrode to the metal sheet;

iii. measuring a dimensional change off the stroke dimension;

iv. correlating the dimensional change in the stroke dimension to a subsequent force to maintain the pressure, and v. applying the subsequent force to compensate for the dimensional change in the stroke dimension to maintain the pressure applied to the contact surface of the metal sheet.

3. The method according to claim 2 wherein the at least one electrode is a AWS Type B or a AWS Type E electrode and the subsequent force is detailed by the following algorithm:

Subsequent Force=Force×Force Stepping Factor (y) given the electrode diameter:

| Electrode Diameter, mm | Force Stepping Factor Formula |
|---|---|
| 4.0 | $y = 0.0278\Delta x^2 + 0.3333\Delta x + 1$ |
| 5.0 | $y = 0.0331\Delta x^2 + 0.3636\Delta x + 1$ |
| 6.0 | $y = 0.04\Delta x^2 + 0.4\Delta x + 1$ |
| 7.0 | $y = 0.0494\Delta x^2 + 0.4444\Delta x + 1$ |
| 8.0 | $y = 0.0625\Delta x^2 + 0.5\Delta x + 1$ |
| 9.0 | $y = 0.0816\Delta x^2 + 0.5714\Delta x + 1$ |
| 10.0 | $y = 0.1111\Delta x^2 + 0.6667\Delta x + 1$ |
| 11.0 | $y = 0.16\Delta x^2 + 0.8\Delta x + 1$ |
| 12.0 | $y = 0.25\Delta x^2 + \Delta x + 1$ | wherein $\Delta x$ is the dimensional change in the stroke dimension.

4. The method according to claim 2 wherein the at least one electrode is a AWS Type A and the subsequent force is determined by the following algorithm:

Subsequent Force=Force×Force Stepping Factor (y) given the electrode diameter,

| Electrode Diameter, mm | Force Stepping Factor Formula |
|---|---|
| 4.0 | $y = 0.0833\Delta x^2 + 0.5774\Delta x + 1$ |
| 5.0 | $y = 0.0533\Delta x^2 + 0.4619\Delta x + 1$ |
| 6.0 | $y = 0.037\Delta x^2 + 0.3849\Delta x + 1$ |
| 7.0 | $y = 0.0272\Delta x^2 + 0.3299\Delta x + 1$ |
| 8.0 | $y = 0.0208\Delta x^2 + 0.2887\Delta x + 1$ |
| 9.0 | $y = 0.0165\Delta x^2 + 0.2566\Delta x + 1$ |
| 10.0 | $y = 0.0133\Delta x^2 + 0.2309\Delta x + 1$ |

-continued

| Electrode Diameter, mm | Force Stepping Factor Formula |
|---|---|
| 11.0 | $y = 0.011\Delta x^2 + 0.2099\Delta x + 1$ |
| 12.0 | $y = 0.0093\Delta x^2 + 0.1925\Delta x + 1$ | wherein $\Delta x$ is the dimensional change in the stroke dimension.

\* \* \* \* \*